3,084,056
PLUGGING AGENT COMPOSITION
Alva Rado Archer, Jr., Monahans, Tex., assignor, by mesne assignments, to Paul Klatt, Monahans, Tex.
No Drawing. Filed May 17, 1961, Ser. No. 110,641
1 Claim. (Cl. 106—163)

My invention relates to selective plugging of oil wells and in particular relates to the utilization of a material in injection wells in areas where secondary recovery by flooding is employed. It is necessary in the water flooding process to plug certain geological formations of the well.

The principal object of my invention is to provide a novel material in connection with a plugging procedure whereby selective plugging may be obtained. Prior to using the product which I employ, it is necessary that preliminary work be performed on the oil well which primarily should include an injectivity curve and a pressure decline curve.

The injectivity curve permits the determination where the well which is to be treated has pressure partings, fractures, loose streaks, packer and casing leaks and other thief zones. It is highly desirable to run tracer logs, spinner surveys and injectivity profiles whenever possible. It is necessary in injection after plugging that the injection should be reduced to about one-half the plugging rate and pressure to allow sands to clean, or the less permeable strata to back-flow any plugging material from the sand face to the fracture.

It has been learned that full injection should be maintained whenever possible after plugging to allow the plugging agent a chance to work itself into the zone as far as possible. This is especially true where pressure partings are encountered.

In order to successfully plug a well, I have prepared a substance made up of 200 parts by weight of tumbleweed (such as the bugseed, the winged pigweed, the herb *Psoralea lanceolata*, the wild indigo *Baptisia tinctoria*, the Russian thistle, and species of Amaranthus), 200 parts by weight water, 4 parts by weight of bicarbonate of soda, 1 part by weight of acetic acid, 9 parts by weight glycerine, 18 parts by weight of calcium chloride and 9 parts by weight of formaldehyde. This is mixed into a slurry. After this slurry has been thoroughly mixed, I boil the slurry for at least thirty minutes. The slurry is then dried, which results in a residuous product resembling a flour-like substance having finely disbursed fibres therein. Prior to mixing and boiling, the tumbleweed is placed in a hammer mill until sufficiently ground to a fineness approaching that of a fine sand. However, it may be necessary, and it is sometimes desirable to provide a coarser mixture, which necessarily will result in a residuous substance being somewhat coarser than flour, depending upon the particular type of usage to which the end product is to be put.

This plugging material made according to my invention was utilized in an oil well having a by-pass hook-up so that the well could be kept by injection treatment. The plugging was evidenced by a sudden rise in pressure. This sudden rise in pressure resulted when as little as 10 lbs. of the plugging agent was inserted into the well through a lubricator.

We have found that this plugging agent tends to fill the fracture at once instead of a slow, continuous process of refilling a lubricator and displacing the plugging agent at stated intervals.

Before my invention, it was necessary to introduce other plugging agents into the lubricator at successive intervals so that there was sufficient agent in the pipe at any time the pump started to break back. Because of the geological formation of the structure surrounding the fractures, this method has not proved entirely satisfactory. Other plugging agents, in order to be effective, must be introduced into the lubricator with various grades of oil and varying amounts of water. Oftentimes, when selective plugging is tried on wells with line pressure and volumes, very little success results because the plugging agent plugs the perforations or settles out to the bottom of the well. Tubing and a packer were employed in one instance and run to a depth just above the perforations and the slurry was injected into the tubing. After the slurry was pumped, it was totally displaced in the formation with additional water and the well shut in for twenty four hours. This treatment resulted in a plugging which was not entirely satisfactory because it required the use of a packer or tubing run directly opposite the thief zone.

In my invention, we do not have to set a packer nor is it necessary to run tubing directly opposite the thief zone.

The product of my invention is forced into the well through the lubricator under pressure.

We use formaldehyde to kill the bacteria and formaldehyde and glycerine to preserve the plugging substance so that it may have a longer life while it is plugging the well, thereby preventing the necessity of removing the plug and re-plugging at a later date. It is necessary to destroy the bacteria so that they will not start growths inside the well to plug up the well.

It can thus be seen that I have developed a plugging agent for use in plugging fractures, lose streaks, packer and casing leaks and pressure partings in oil wells which is rapidly and readily effective to permit the use of water flooding principles in wells where secondary recovery is desired with maximum efficiency.

Having thus described my invention, what I claim as new and useful and desire to secure by United States Letters Patent is:

A composition for use as a plugging agent in oil wells consisting of 45.3% by weight of finely divided tumbleweed, 45.3% by weight of water, .9% by weight caustic soda, .3% by weight of acetic acid, 1.9% by weight of glycerine, 4.4% by weight calcium chloride and 1.9% by weight of formaldehyde.

References Cited in the file of this patent
UNITED STATES PATENTS

| | | |
|---|---|---|
| 1,452,463 | Huber | Apr. 17, 1923 |
| 2,345,611 | Lerch et al. | Apr. 4, 1944 |
| 2,699,213 | Cardwell et al. | Jan. 11, 1955 |
| 2,796,934 | Vogel | June 25, 1957 |
| 2,990,016 | Goins et al. | June 27, 1961 |

OTHER REFERENCES

Analytical Laboratory Report No. CH–102, "A Review of the Use of Chemical Sealants for Reduction of Canal Seepage Losses," February 9, 1960. (Note items 13 and 112.)